Jan. 6, 1931.  L. P. CAMPBELL  1,787,471
MOWER CUTTER REEL
Filed May 29, 1929
FIG. I
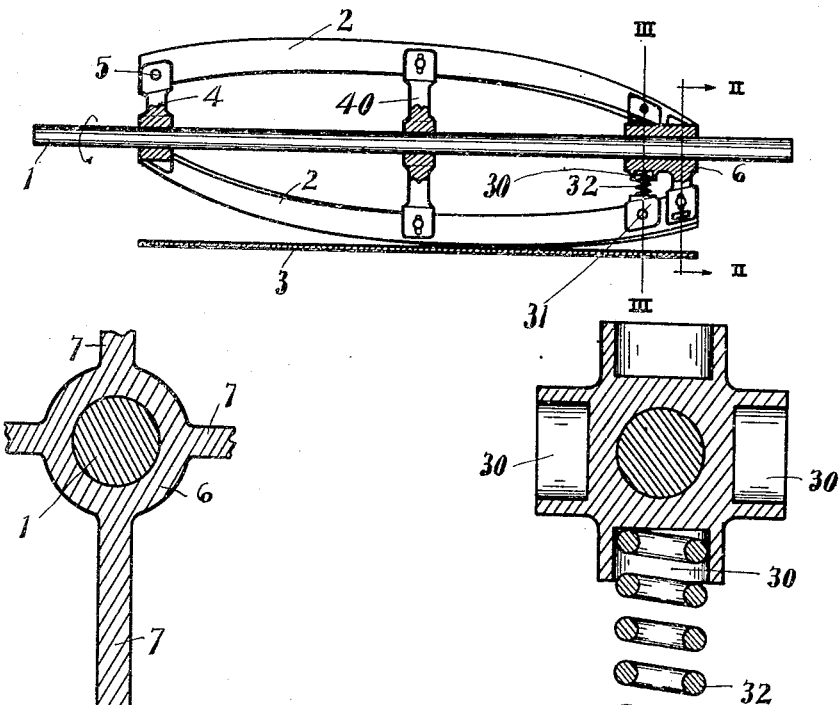
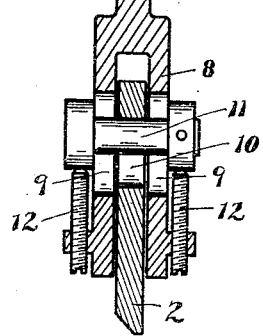
FIG. II
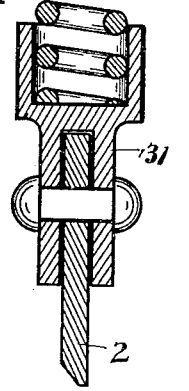
FIG. III
INVENTOR
Lawrence P. Campbell.
by Christy Christy & Wharton
his attorneys.

Patented Jan. 6, 1931

1,787,471

UNITED STATES PATENT OFFICE

LAWRENCE P. CAMPBELL, OF SHARPSBURG, PENNSYLVANIA

MOWER CUTTER REEL

Application filed May 29, 1929. Serial No. 366,967.

This invention relates to improvements in lawn-mowers, and consists in a modification of the mower cutter-reel structure which results in improved mowing efficiency, and simplifies the operation of sharpening and adjusting the blades.

In the accompanying drawings Fig. I is a view in vertical section of a mower reel embodying the improvements of my invention, and indicates a cutter-bar associated therewith; Fig. II is a view in section taken on the plane II—II of Fig. I, and showing in enlarged detail a novel feature of the reel construction; and Fig. III is a similar view taken on the plane III—III of Fig. I.

Referring to the drawings the numeral 1 designates the shaft of the cutter-reel to which (by means of suitable brackets) a plurality of cutter-blades 2 are fixed to revolve therewith and to cooperate with a cutter-bar 3 effectively to obtain the desired mowing action. In order that the most efficient mowing action may be had, it is essential that the blades of the cutter-reel contact the cutter-bar throughout their length in a manner similar to the progressive contact between the two blades of a pair of scissors. It is desirable, furthermore, that the pressure with which the reel blades contact the cutter-bar shall be substantially constant along the lengths of the blades, and thus insure uniform wearing of the several blades.

In providing means to obtain the aforesaid desired contact between the reel cutter-blades 2 and the cutter-bar 3, I have found that the blades 2 may be advantageously pivoted at their left-hand ends in a bracket 4 which is fixed to the shaft 1. The axes of the pivot-pins 5, as shown, extend transversely to the axis of shaft 1 at an angle of 90 degrees. Obviously the cutter-bar may be adjusted relatively to the left-hand ends of the reel cutter-blades, and the initial contact of each blade therewith may, therefore, be regulated as desired. In order that the desired contact between the blades 2 and the bar 3 (following the initial contact) may continue along the length of the blades, I have provided the bracket member 6 adjacent the right-hand ends of the blades.

As indicated in Fig. II the bracket 6 comprises radial arms 7 having bifurcated ends 8 to receive the blades 2. The slots 9 are provided in the ends 8, and a slot 10 is provided in each blade. Passing through each of these slots is a pin 11, which is adjustable radially of the shaft 1 by means of set-screws 12. The arrangement permits the right-hand ends of the blades 2 to move radially of the shaft 1 through a distance defined by the slot 10.

As indicated in Fig. III the bracket 6 is formed with sockets 30 which, in conjunction with the socket-brackets 31 fixed to the blades 2, serve to retain expansion springs 32 in alignment with bracket arms 7. Obviously this organization of elements tends resiliently to maintain the right-hand ends of the blades as far outwardly from the axes of their rotation as their associated pins 11 and slots 10 will permit, and, thereby, a practically uniform, continuous and yielding contact between the blades and the cutter-bar is realized after the initial contact therebetween, as explained above.

In reels having blades of extraordinary length it may be desirable to place additional brackets 6 at other locations along the reel shaft to operatively engage the blades. In the present device I have shown only a single bracket 6, and have shown a bracket 40 disposed centrally of the reel to lend lateral and not radial support to the blades 2.

What I claim is:

1. A mower reel including a shaft and a plurality of blades connected to rotate therewith, a bracket for pivotally mounting the one ends of said blades, together with means to retain the other ends of said blades and tending yieldingly to maintain said right-hand ends radially outwardly from said shaft.

2. A mower reel including a shaft and a plurality of blades connected to rotate therewith, means for pivotally mounting the one ends of said blades, the axis of pivoting being located at an interval of space from and extending angularly to the axis of rotation of said reel, together with means for retaining the other ends of said blades and tending resiliently to maintain said blades outwardly from said shaft.

3. In combination with a mower including a cutter-bar and a reel having a shaft with cutter-blades connected to rotate therewith, means for retaining said blades and tending resiliently to maintain them outwardly from their axis of rotation.

4. In combination with a mower including a cutter-bar and a reel having a shaft with cutter-blades connected to rotate therewith, adjustable means severally associated with said cutter-blades tending to maintain each cutter-blade yieldingly in contact with said cutter-bar as in rotation each cutter-blade moves over the cutter-bar.

In testimony whereof I have hereunto set my hand.

LAWRENCE P. CAMPBELL.

CERTIFICATE OF CORRECTION.

Patent No. 1,787,471.            Granted January 6, 1931, to

LAWRENCE P. CAMPBELL.

It is hereby certified that error appears in the printed specification of the above numbered patent requiring correction as follows: Page 1, lines 89 and 90, claim 1, for the word "right-hand" read other; and that the said Letters Patent should be read with this correction therein that the same may conform to the record of the case in the Patent Office.

Signed and sealed this 3rd day of February, A. D. 1931.

(Seal)            M. J. Moore,
Acting Commissioner of Patents.